United States Patent [19]
Matsuoka et al.

[11] 3,943,899
[45] Mar. 16, 1976

[54] ATMOSPHERIC PRESSURE COMPENSATING MEANS FOR AN ENGINE INTAKE SYSTEM

[75] Inventors: Sadao Matsuoka, Hiroshima; Takashi Takeshita, Hiroshima; Tomoo Tadokoro; Masami Nakao, both of Hiroshima, all of Japan

[73] Assignee: Toyo Kogyo Co., Ltd., Japan

[22] Filed: Apr. 3, 1974

[21] Appl. No.: 457,546

[30] Foreign Application Priority Data
Apr. 6, 1973    Japan.................... 48-42326[U]

[52] U.S. Cl............ 123/119 DB; 261/39 A; 261/63
[51] Int. Cl.².......................................... F02M 7/12
[58] Field of Search....... 123/119 D, 75 D, 119 DB, 123/97 B, 124, 119 B; 261/39 A, 41 D, 56, 63

[56] References Cited
UNITED STATES PATENTS

| | | | |
|---|---|---|---|
| 2,152,028 | 3/1939 | Church.................... | 123/119 DB |
| 2,207,152 | 7/1940 | Huber...................... | 123/119 D |
| 3,011,770 | 12/1961 | Stoltman................. | 261/39 A |
| 3,626,915 | 12/1971 | Nakajima................ | 123/119 D X |
| 3,677,526 | 7/1972 | Pierlot.................... | 261/39 A X |
| 3,738,109 | 6/1973 | Tatsutomi et al....... | 123/119 D X |
| 3,759,232 | 9/1973 | Wahl et al.............. | 123/119 D |
| 3,836,128 | 9/1974 | Lunsford................. | 261/39 A |
| 3,841,612 | 10/1974 | Freismuth et al...... | 261/39 A |

Primary Examiner—Charles J. Myhre
Assistant Examiner—William C. Anderson
Attorney, Agent, or Firm—Fleit & Jacobson

[57] ABSTRACT

Atmospheric pressure compensating means for an engine intake system, which includes an air bypass passage extending between the upstream side and downstream side of a throttle valve in an engine intake passage, and a control valve provided in the bypass passage for controlling the bypass passage area in accordance with pressure difference between the atmospheric pressure and suction pressure in said intake passage so that said passage area is increased in response to a decrease in said pressure difference.

7 Claims, 6 Drawing Figures

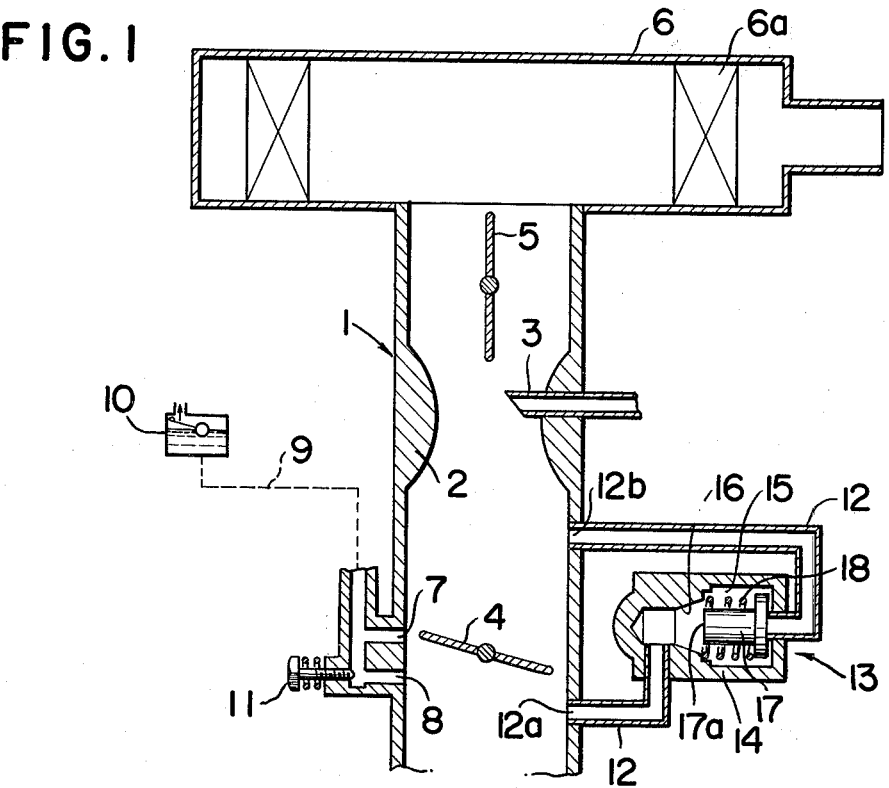
FIG. 1
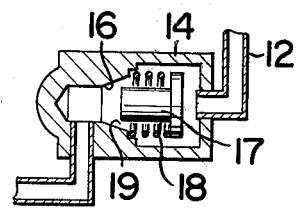
FIG. 2
FIG. 6
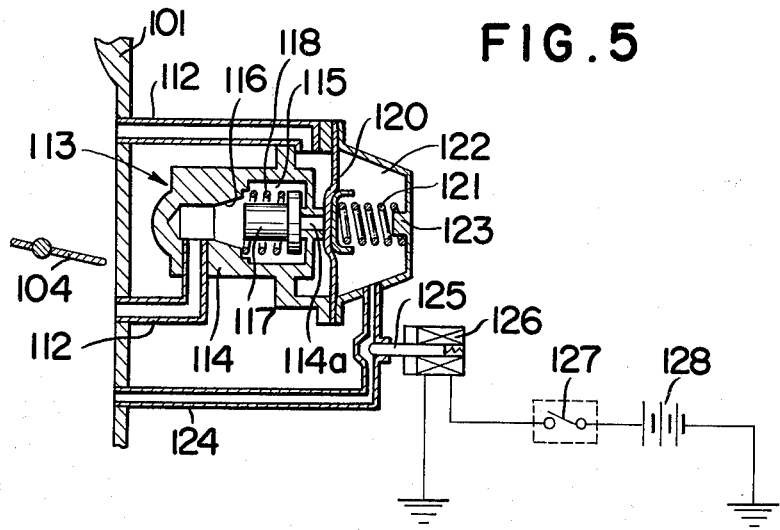
FIG. 5

ATMOSPHERIC PRESSURE COMPENSATING MEANS FOR AN ENGINE INTAKE SYSTEM

The present invention relates to an internal combustion engine intake system having atmospheric pressure compensating means. More particularly, the present invention relates to means for introducing suitable amount of air into an internal combustion engine irrespective of change in atmospheric pressure.

In an internal combustion engine having carburetor means calibrated so as to provide a fuel-air mixture of an appropriate mixing ratio, it has often been experienced that when the engine is operated under a high altitude the amount of intake air is so decreased that it is stopped in an extreme condition during idling operation due to lack of oxygen. Further, in an engine having exhaust gas cleaning means such as a thermal reactor or a catalytic reactor, cleaning action of the exhaust gas cleaning means is reduced when the engine is operated at a high altitude due to a decrease in oxygen.

The present invention therefore has an object to eliminate the aforementioned problems as experienced in conventional engines.

A further object of the present invention is to provide an engine intake system having means for compensating change in atmospheric pressure.

A further objects of the present invention is to provide an intake system suitable for use in an internal combustion engine having exhaust gas cleaning means.

The above and other objects of the present invention can be achieved, in an intake system for an internal combustion engine having intake passage means provided with throttle valve means, by atmospheric pressure compensating means including air bypass passage means having one end opening to a portion of said intake passage means downstream side of the throttle valve means and the other end to another portion of said intake passage means upstream side of said throttle valve means, and control valve means provided in said bypass passage means for controlling passage area of said bypass passage means in accordance with pressure difference between the atmospheric pressure and suction pressure in said intake passage means, so that said passage area is increased in response to a decrease in said pressure difference.

In an intake system having air cleaning means, the bypass passage means may open to the air cleaning means, so that the wording "portion of the intake passage means upstream side of said throttle valve means" shall be construed as being broad enough to include such an arrangement that has an upstream end of the bypass passage means opening to the air cleaning means. It should further be noted that the present invention can be applied not only to an engine intake system having carburetor means but also to a fuel injection type engine intake system.

It is known that the difference between the atmospheric pressure and the intake suction pressure in an internal combustion engine decreases in proportion to an increase in altitude. According to the arrangement of the present invention, when an engine is operated at a high altitude, additional air is introduced into the engine whereby sufficient amount of oxygen can be supplied to the engine. According to a further aspect of the present invention, means is provided for bringing the control valve means into operation only during idling or low speed operation of the engine.

The above and other objects and features of the present invention will become apparent from the following descriptions of preferred embodiments taking reference to the accompanying drawings, in which:

FIG. 1 is a diagrammatical sectional view of an engine intake system in accordance with one embodiment of the present invention;

FIG. 2 shows operation of the control valve employed in the embodiment shown in FIG. 1 in one position;

FIG. 5 is a sectional view showing another embodiment of the present invention.

FIG. 6 is a view similar to FIG. 2 showing the parts in another operating position.

Figure 3:
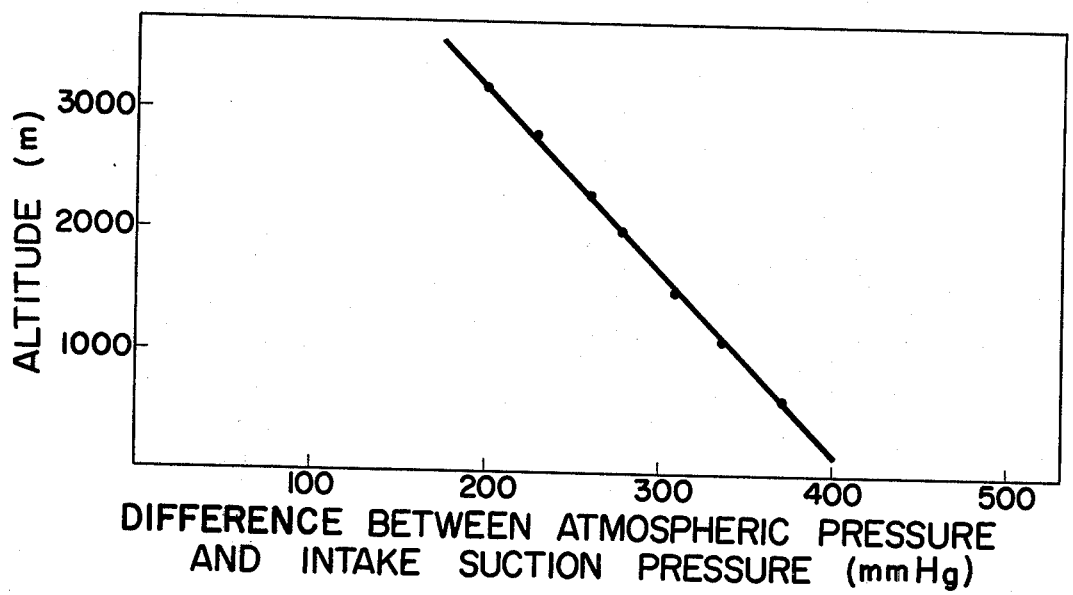
FIG. 3 is a diagram showing the relationship between the altitude and the pressure difference between the atmospheric pressure and the intake suction pressure.

Referring to the drawings, particularly to FIG. 1, there is shown an engine intake system including an intake passage 1 formed with a venturi 2. At the area of the venturi 2, there is provided a main fuel nozzle 3 as in a conventional engine intake system. Further, the intake passage 1 is provided with a throttle valve 4 at the downstream side of the venturi 2 and a choke valve 5 at the upstream side of the venturi 2. At the upstream end of the intake passage 1, there is provided an air cleaner 6 which has a filter element 6a disposed therein. The intake passage 1 further has a slow port 7 and an idle port 8 which are connected through a fuel passage 9 with a float chamber 10. An adjusting screw 11 is provided in the fuel passage leading to the idle port 8 so as to regulate the amount of fuel supplied through the port 8.

According to a feature of the present invention, a bypass passage 12 is provided in the intake passage 1. The bypass passage 12 opens at one end 12a to the intake passage at the downstream side of the throttle valve 4 and at the other end 12b at a portion of the intake passage 1 between the venturi 2 and the throttle valve 4. It should of course be noted that the upstream end of the bypass passage 12 may be opened directly to the air cleaner 6. In the bypass line 12, there is provided a control valve 13 which comprises a valve housing 14 having a valve chamber 15 formed with a conical valve face 16. A valve member 17 is disposed in the valve chamber 15 with an end 17a opposed to the conical valve face 16. A spring 18 is provided for urging the valve member 17 away from the conical valve face 16.

In operation, air is taken through the air cleaner 6 into the intake passage 1 and passed therein through the venturi 2 and the throttle valve 4. Under a normal operating condition, fuel is supplied from the main fuel nozzle 3 into the intake passage 1 at the venturi 2. Under an idling or low speed operation, however, the throttle valve 4 is closed and fuel is mainly supplied through the slow port 7 and the idling port 8. By adjusting the screw 11, the amount of fuel supplied through the idle port 8 can be suitably adjusted so that suitable fuel-air mixture is provided for idling operation.

Figure 4:
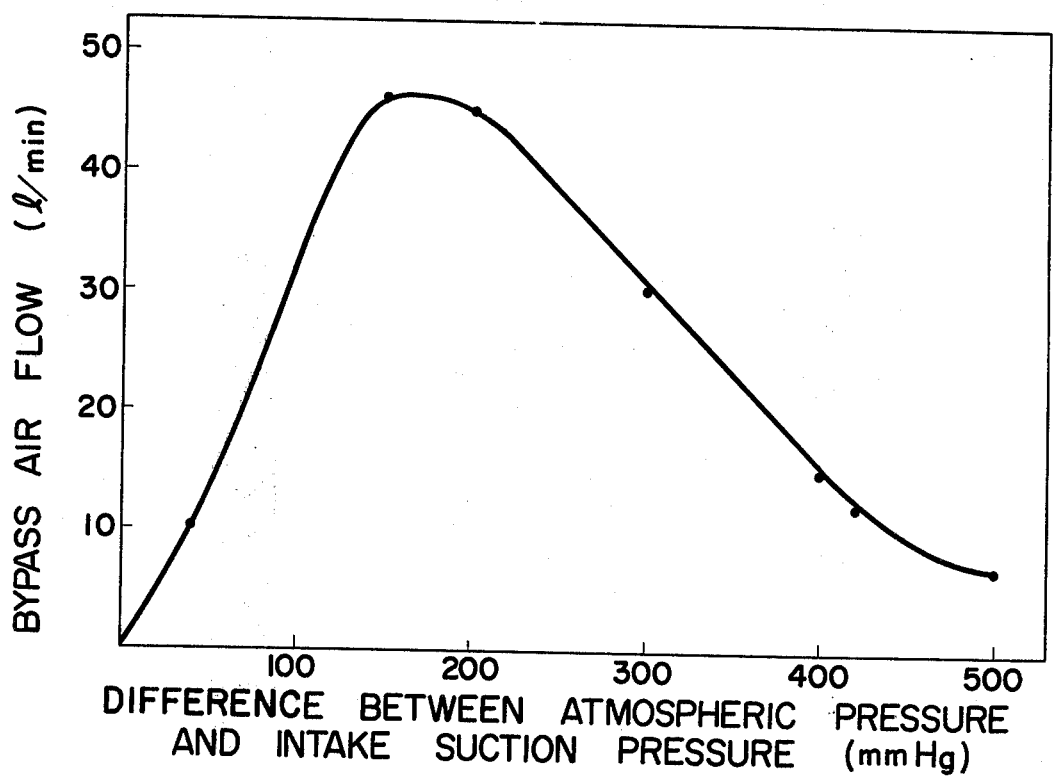
FIG. 4 is a diagram showing the relationship between the amount of intake air and the pressure difference between the atmospheric pressure and the intake suction pressure.

Referring now to FIG. 3, it is noted that the difference between the atmospheric pressure and the intake suction pressure decreases in proportion to an increase in the altitude under which the engine is operated. Therefore, in a conventional engine, the amount of air taken into the engine is remarkably decreased. According to the present invention, the control valve 13 serves to compensate for such a decrease in the amount of intake air. During engine idling operation at a standard altitude, a substantial pressure difference prevails across the throttle valve 4 as clearly noted in FIG. 3 so that the valve member 17 is displaced toward left against the action of the spring 18 as shown in FIG. 2(a) so as to leave only a narrow clearance 19 between the end 17a of the valve member 17 and the conical valve face 16. However, when the engine is idled under a high altitude, the pressure difference is decreased so that the valve member 17 is displaced toward right as shown in FIG. 2(b) to increase the clearance 19. Thus, an increased amount of air is allowed to pass through the bypass passage 12. FIG. 4 shows the change in the amount of air taken into the engine through the bypass passage 12 with respect to the change in the difference between the atmospheric pressure and the engine intake suction pressure. Therefore, the arrangement shown in FIG. 1 is effective to maintain a substantially constant mixing ratio of the fuel-air mixture taken into the engine during idling operation irrespective of change in altitude under which the engine is operated. Although the control valve 13 shown in FIG. 1 is always under operation as far as the engine associated therewith is operated, it should be noted that the bypass air through the passage 12 does not have any effect on the mixing ratio of the intake fuel-air mixture during normal engine operation since the upstream end 12b of the bypass passage 12 opens to the intake passage 1 at the downstream side of the main fuel nozzle 3.

Referring now to FIG. 5, there is shown a second embodiment of the present invention which comprises an engine intake passage 101 and a throttle valve 104 disposed therein. As in the previous embodiment, a bypass passage 112 is provided across the throttle valve 104. Further, in the bypass passage 112, there is provided a control valve 113 which comprises a valve housing 114 having a valve chamber 115 and a conical valve face 116. A valve member 117 and a spring 118 is also disposed in the valve chamber 115. Adjacent to the inlet 114a to the valve chamber 115, the bypass passage 112 is provided with a diaphragm valve including a diaphragm 120 which is biased toward the valve housing 114 by a spring 121 so as to close the inlet 114a. A diaphragm chamber 122 is defined by a housing 123 and connected through a conduit 124 with the intake passage 101 at the downstream side of the throttle valve 104. In the conduit 124, there is provided a shut-off valve 125 which is actuated into open position by a solenoid 126 when it is energized through a switch 127 by an electric power source 128. In the illustrated arrangement, the valve 125 is closed when the switch 127 is opened. During engine idling operation, the switch 127 is automatically closed by being interconnected for example with the throttle valve 104 so that the valve 125 is opened. Thus, negative pressure in the intake passage 101 is introduced into the diaphragm chamber 122 whereby the diaphragm 120 is displaced toward right so as to open the inlet 114a of the valve chamber 115.

From the above descriptions, it will be apparent that the present invention provides novel means for compensating changes in atmospheric pressure so that fuel-air mixture of uniform mixing ratio can be provided for idling operation irrespective of change in altitude under which the engine is operated. Although the invention has been shown and described with reference to specific embodiments, it should be noted that the invention is in no way limited to the details of the illustrated embodiments. For example, the invention has been described with reference to such embodiments that have conventional carburetors, however, the invention can of course be applied to a fuel injection type internal combustion engine. Thus, the scope of the invention shall be limited only by the appended claims.

We claim:
1. In an intake system for an internal combustion engine having intake passage means provided with throttle valve means therein, an atmospheric pressure compensating device comprising:
   a. air bypass passage means having one end communicating with the intake passage means on the downstream side of the throttle valve means and the other end communicating with the intake passage means on the upstream side of said throttle valve means,
   b. control valve means in said bypass passage means for controlling the air flow therethrough,
   c. said control valve means including a valve housing defining a valve chamber, and having a valve face and an air inlet, said valve chamber being in communication with said one end of said bypass passage means at said valve face and with said other end of said bypass passage means at said air inlet,
   d. a valve member arranged for sliding movement in said valve housing and having one end opposed to said valve face to control a clearance space between said valve face and said valve number one end in response to the pressure difference between the atmospheric pressure and suction pressure in said intake passage means so that said clearance is increased in response to a decrease in said pressure difference,
   e. spring means disposed in said valve housing for urging said valve member away from said valve face to increase said clearance.

2. The atmospheric pressure compensating device in accordance with claim 1 in which said intake passage means is provided with venturi means at the upstream side of said throttle valve means, and fuel nozzle means disposed at the venturi means, said other end of the bypass passage means being in communication with said intake passage means between the venturi means and the throttle valve means.

3. The atmospheric pressure compensating means in accordance with claim 1 including air cleaning means in the intake passage means and said other end of the bypass passage means is opened to said air cleaning means.

4. The atmospheric pressure compensating device in accordance with claim 1 including means for operatively conditioning said control valve means only during engine idling operation.

5. The atmospheric pressure compensating device in accordance with claim 1, wherein said valve face of said valve housing is conical.

6. The atmospheric pressure compensating device in accordance with claim 5, which further comprises disphragm valve means for closing said air inlet, said diaphragm valve means including a diaphragm normally biased toward said inlet in closing relationship therewith, a diaphragm chamber adjacent to said diaphragm, and means for introducing a negative pressure to said diaphragm chamber during engine idling operation so as to displace the diaphragm in spaced relationship with said air inlet of the valve chamber.

7. The atmospheric pressure compensating device in accordance with claim 5 in which said negative pressure introducing means comprises a conduit connecting said diaphragm chamber with the intake passage means at the downstream side of the throttle valve means, a solenoid operated shut-off valve disposed in said conduit, means for selectively actuating said solenoid operated shut-off valve means.

* * * * *